US011238901B1

United States Patent
Lefebvre et al.

(10) Patent No.: US 11,238,901 B1
(45) Date of Patent: Feb. 1, 2022

(54) GENERATION OF AUDIO-SYNCHRONIZED VISUAL CONTENT

(71) Applicant: GoPro, Inc., San Mateo, CA (US)

(72) Inventors: Alexis Lefebvre, Paris (FR); Guillaume Oulès, Bordeaux (FR); Anandhakumar Chinnaiyan, Fremont, CA (US); Maxime Renaudet, San Mateo, CA (US); Anaïs Oulès, Bordeaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/948,130

(22) Filed: Sep. 3, 2020

(51) Int. Cl.
| | |
|---|---|
| *G11B 27/34* | (2006.01) |
| *H04R 1/02* | (2006.01) |
| *H04N 9/87* | (2006.01) |
| *G11B 27/32* | (2006.01) |
| *G11B 27/031* | (2006.01) |
| *H04N 5/225* | (2006.01) |

(52) U.S. Cl.
CPC ............ *G11B 27/34* (2013.01); *G11B 27/031* (2013.01); *G11B 27/32* (2013.01); *H04N 9/87* (2013.01); *H04R 1/02* (2013.01); *H04N 5/2252* (2013.01)

(58) Field of Classification Search
CPC ....... G11B 27/34; G11B 27/031; G11B 27/32; H04R 1/02; H04N 9/87; H04N 5/2252
USPC .......................................................... 386/224
See application file for complete search history.

(56) References Cited

U.S. PATENT DOCUMENTS

| | | | |
|---|---|---|---|
| 9,838,730 B1 * | 12/2017 | Matias | ............... H04N 21/4302 |
| 2011/0234480 A1 * | 9/2011 | Fino | ..................... H04N 21/482 |
| | | | 345/156 |
| 2018/0295427 A1 * | 10/2018 | Leiberman | ......... H04N 21/8166 |

\* cited by examiner

*Primary Examiner* — Loi H Tran
(74) *Attorney, Agent, or Firm* — Esplin & Associates, PC

(57) ABSTRACT

An image capture device may provide playback of audio content during capture of visual content. Moments within the audio content may be associated with cue markers. The visual content may be synchronized with the audio content provided during capture, and a video edit may be automatically generated based on the moments associated with the cue markers.

12 Claims, 7 Drawing Sheets image capture device 502 audio content playback 504

GENERATION OF AUDIO-SYNCHRONIZED VISUAL CONTENT

FIELD

This disclosure relates to generating audio-synchronized visual content based on playback of audio content during capture of the visual content.

BACKGROUND

A user may wish to create a video edit from multiple video clips and synchronize the video edit to sound, such as music. Synchronizing a video edit to sound may be difficult and time consuming.

SUMMARY

This disclosure relates to image capture devices that generates audio-synchronized visual content. An image capture device may include a housing. The housing may carry one or more of an image sensor, an optical element, a speaker, and/or other components. The optical element may guide light within a field of view to the image sensor. The image sensor may generate a visual output signal conveying visual information defining visual content based on light that becomes incident thereon. The speaker may provide playback of audio content for capture of the visual content.

Audio information and/or other information may be obtained. The audio information may define the audio content. The audio content may have an audio progress length. Moments within the audio progress length may be associated with cue markers. The playback of at least a portion of the audio progress length of the audio content through the speaker may be effectuated for the capture of the visual content. The visual content may be captured during a capture duration with the playback of the at least the portion of the audio progress length of audio content. The visual content may have a visual progress length based on the capture duration and/or other information. The visual content captured during the capture duration may be synchronized with the at least the portion of the progress length of the audio content. The visual content captured during the capture duration may be synchronized such that one or more moments within the visual progress length of the visual content are associated with one or more of the cue markers of the audio content.

A video edit may be generated based on the cue markers and/or other information. A video edit may be generated such that at least a portion of the visual content captured during the capture duration is included within the video edit based on the association of the moment(s) within the visual progress length of the visual content with the cue marker(s) of the audio content and/or other information.

An electronic storage may store visual information, information relating to visual content, audio information, information relating to audio content, information relating to cue markers, information relating to playback of audio content, information relating to capture of visual content with playback of audio content, information relating to synchronization of visual content captured with playback of audio content, information relating to association of moments within visual progress length of visual content with cue markers of the audio content, information relating to video edit, and/or other information.

The housing may carry one or more components of the image capture device. The housing may carry (be attached to, support, hold, and/or otherwise carry) one or more of an image sensor, an optical element, a speaker, a processor, an electronic storage, and/or other components.

The image sensor may be configured to generate a visual output signal and/or other output signals. The visual output signal may convey visual information based on light that becomes incident thereon and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The speaker may be configured to provide playback of audio content. The playback of the audio content may be provided for capture of the visual content.

The processor(s) may be configured by machine-readable instructions. Executing the machine-readable instructions may cause the processor(s) to facilitate generating audio-synchronized visual content. The machine-readable instructions may include one or more computer program components. The computer program components may include one or more of an audio information component, an audio playback component, a capture component, a synchronization component, and/or other computer program components.

The audio information component may be configured to obtain audio information and/or other information. The audio information may define audio content. The audio content may have an audio progress length. Moments within the audio progress length may be associated with cue markers. In some implementations, the audio content may include music. The moments within the audio progress length associated with the cue markers may include bars and/or beats of the music. In some implementations, the audio content may include verbal direction.

The audio playback component may be configured to effectuate playback of audio content through one or more speakers. The audio playback component may be configured to effectuate playback of at least a portion of the audio progress length of the audio content through the speaker(s) for capture of the visual content.

In some implementations, the playback of the audio content may pause at an end of the capture duration. The playback of the audio content may continue at a beginning of another capture duration.

In some implementations, one or more previews of the audio content may be provided prior to the capture of the visual content. In some implementations, one or more previews of at least the portion of the audio progress length of the audio content may be provided prior to the capture of the visual content.

In some implementations, an extent of the audio content to be played back during the capture of the visual content may be determined prior to the capture of the visual content. In some implementations, at least the portion of the audio progress length of the audio content played back during the capture duration may be determined prior to the capture of the visual content.

The capture component may be configured to capture the visual content during a capture duration. The capture component may be configured to capture the visual content with the playback of the audio content. The capture component may be configured to capture the visual content with the playback of at least the portion of the audio progress length of audio content. The visual content may have a visual progress length based on the capture duration and/or other information.

In some implementations, one or more audio tracks for the visual content captured during the capture duration may include at least the portion of the audio progress length of the audio content.

The synchronization component may be configured to synchronize the visual content captured during the capture duration with the progress length of the audio content. The synchronization component may be configured to synchronize the visual content captured during the capture duration with at least the portion of the progress length of the audio content. The synchronization component may be configured to synchronize the visual content captured during the capture duration such that one or more moments within the visual progress length of the visual content are associated with one or more cue markers of the audio content.

A video edit may be generated based on the cue markers and/or other information. A video edit may be generated such that at least a portion of the visual content captured during the capture duration is included within the video edit. At least the portion of the visual content captured during the capture duration may be included within the video edit based on the association of the moment(s) within the visual progress length of the visual content with the cue marker(s) of the audio content and/or other information.

In some implementations, the video edit may be generated to include one or more bar-synced effects and/or one or more beat-synced effects based on the association of the moments within the audio progress lengths with the bars and/or the beats of the music, and/or other information.

In some implementations, the video edit may be generated to include portions from multiple visual content captured during separate capture durations. Individual ones of the multiple visual content may be synchronized with a corresponding portion of the audio content. Transitions within the video edit between different portions from the multiple visual content may be determined based on association of moments within corresponding visual progress length of the multiple visual content with the cue markers of the audio content, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
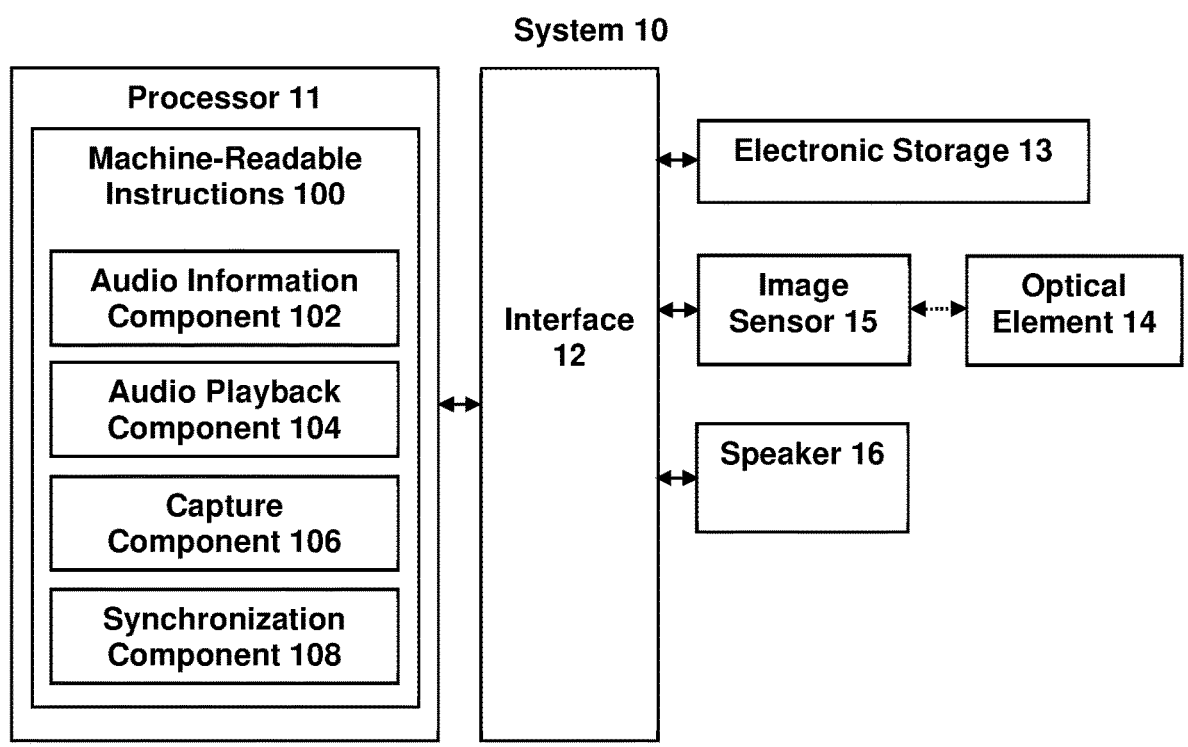
FIG. 1 illustrates an example system that generates audio-synchronized visual content.

FIG. 1 illustrates a system 10 for generating audio-synchronized visual content. The system 10 may include one or more of a processor 11, an interface 12 (e.g., bus, wireless interface), an electronic storage 13, an optical element 14, an image sensor 15, a speaker 16, and/or other components. The system 10 may include and/or be part of an image capture device. The image capture device may include a housing, and one or more of the optical element 14, the image sensor 15, the speaker 16, and/or other components of the system 10 may be carried by the housing the image capture device. The optical element 14 may guide light within a field of view to the image sensor 15. The image sensor 15 may generate a visual output signal conveying visual information defining visual content based on light that becomes incident thereon. The speaker 16 may provide playback of audio content for capture of the visual content.

Audio information and/or other information may be obtained by the processor 11. The audio information may define the audio content. The audio content may have an audio progress length. Moments within the audio progress length may be associated with cue markers. The playback of at least a portion of the audio progress length of the audio content through the speaker may be effectuated by the processor 11 for the capture of the visual content. The visual content may be captured by the processor 11 during a capture duration with the playback of the at least the portion of the audio progress length of audio content. The visual content may have a visual progress length based on the capture duration and/or other information. The visual content captured during the capture duration may be synchronized with the at least the portion of the progress length of the audio content by the processor 11. The visual content captured during the capture duration may be synchronized such that one or more moments within the visual progress length of the visual content are associated with one or more of the cue markers of the audio content.

A video edit may be generated by the processor 11 based on the cue markers and/or other information. A video edit may be generated such that at least a portion of the visual content captured during the capture duration is included within the video edit based on the association of the moment(s) within the visual progress length of the visual content with the cue marker(s) of the audio content and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, audio information, information relating to audio content, information relating to cue markers, information relating to playback of audio content, information relating to capture of visual content with playback of audio content, information relating to synchronization of visual content captured with playback of audio content, information relating to association of moments within visual progress length of visual content with cue markers of the audio content, information relating to video edit, and/or other information.

Visual content may be captured by an image capture device during playback of audio content. Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound provided/to be provided as an accompaniment for the visual content. Audio content may include one or more of voices, activities, songs, music, soundtrack, and/or other audio/sounds. For example, audio content may include music to be played during capture of visual content and/or playback of visual content.

Visual content and/or audio content may be stored in one or more formats and/or one or more containers. A format may refer to one or more ways in which the information defining content (visual content, audio content) is arranged/laid out (e.g., file format). A container may refer to one or more ways in which information defining content is arranged/laid out in association with other information (e.g., wrapper format). Information defining visual content (visual information) and/or information defining audio content (audio information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or be a part of the system 10. One or more portions of the system 10 may be remote from or be a part of the image capture device.

Figure 3:
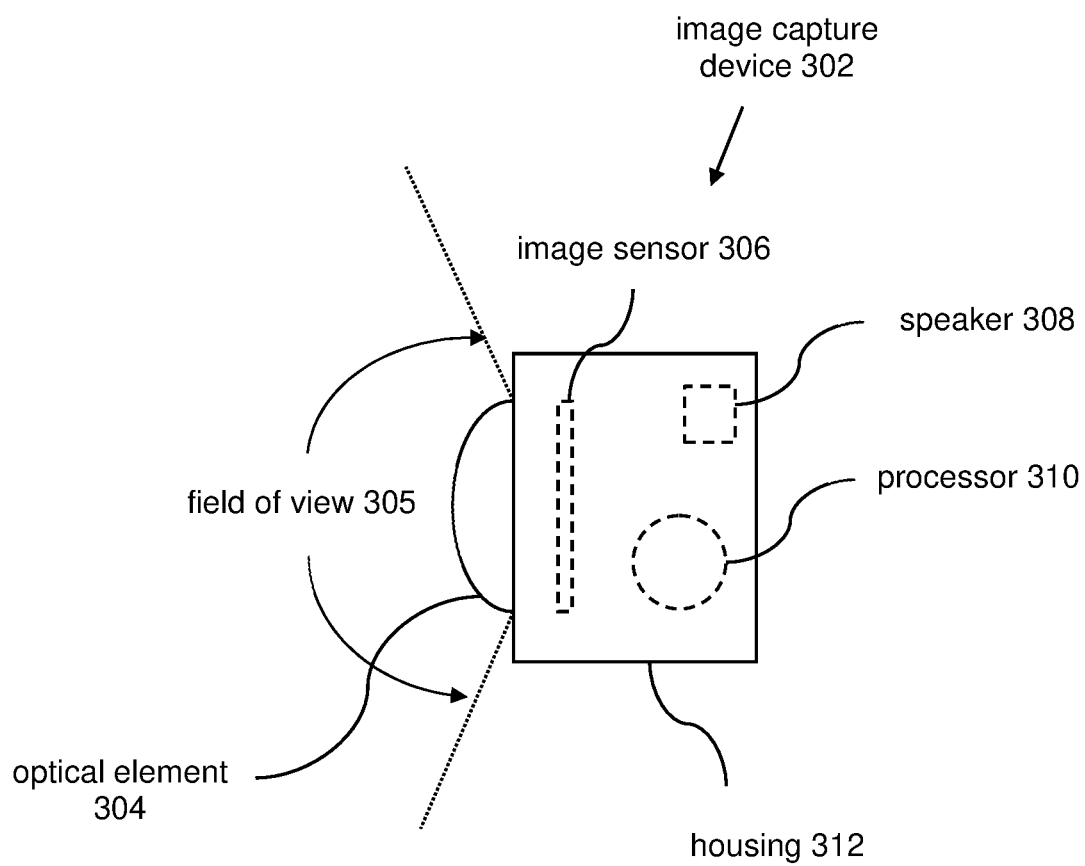
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a speaker 308, a processor 310, and/or other components.

One or more components of the image capture device 302 may be the same as, be similar to, and/or correspond to one or more components of the system 10. For example, the processor 308 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The speaker 308 may be the same as, be similar to, and/or correspond to the speaker 16. The housing may carry other components, such as the electronic storage 13. The image capture device 302 may include other components not shown in FIG. 3. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view 305. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The speaker 308 may refer to an electronic device that provides audible presentation of information. The speaker 308 may refer to an electronic device that makes sound. The speaker 308 may produce audio output in form of sound waves. The speaker 308 may include one or more transducers that coverts audio signal into sound. The speaker 308 may be configured to provide playback of audio content. The playback of the audio content may be provided for capture of visual content. The playback of the audio content may be provided during part(s) of or entirety of the capture duration for the visual content. For example, the speaker 308 may provide playback of audio content, such as a song and/or verbal direction, during capture of visual content by the image capture device 302.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), facilitate operation of the image sensor 306 (e.g., change how the received light is converted into information that defines images/videos and/or how the images/videos are post-processed after capture), and/or facilitate operation of the speaker 308 (e.g., change how the speaker 308 produces sound).

The processor 310 may obtain information from the image sensor 306 and/or facilitate transfer of information from the image sensor 306 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may play audio content (e.g., music) through the speaker 308 during capture of visual content. Moments within an audio progress length of the audio content may be associated with cue markers. Visual content captured by the image capture device 302 during playback of the audio content may be synchronized with the audio content such that one or more moments within visual progress length of the visual content are associated with one or more cue markers of the audio content. The synchronization of the captured visual content with audio content played back during visual content capture may be used in generating one or more video edits. For example, specific portions of the visual content captured during playback of the audio content may be included within the video edit based on association of the moment(s) within the visual progress length of the visual content with the cue marker(s) of the audio content. The video edit may include portions of single visual content or multiple visual content (e.g., multiple visual content captured at different times, with individual visual content synchronized with the audio content played during visual content capture). The video edit may include audio content captured with capture of the visual content and/or the audio content that was played back during capture of the visual content. For example, visual content may be captured with playback of music, and a video edit of the visual content may be generated (1) using synchronization of the visual content with the music, and (2) with the music as the audio content of the video edit (e.g., insert the music in an audio track of the video edit). Such synchronization of visual content with audio content played back during capture of the visual content may enable generation of video edit directly from the image capture device/from visual content provided by the image capture device.

Referring back to FIG. 1, the processor 11 (or one or more components of the processor 11) may be configured to obtain information to facilitate generating audio-synchronized visual content. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating audio-synchronized visual content. The machine-readable instructions 100 may include one or more computer program components. The machine-readable instructions 100 may include one or more of an audio information component 102, an audio playback component 104, a capture component 106, a synchronization component 108, and/or other computer program components.

The audio information component 102 may be configured to obtain audio information and/or other information. Obtaining audio information may include one or more of accessing, acquiring, analyzing, determining, examining, generating, identifying, loading, locating, opening, receiving, retrieving, reviewing, storing, and/or otherwise obtaining the audio information. The audio information component 102 may obtain audio information from one or more locations. For example, the audio information component 102 may obtain audio information from a storage location, such as the electronic storage 13, electronic storage of a device accessible via a network, and/or other locations. The audio information component 102 may obtain audio information from one or more hardware components (e.g., a physical storage device) and/or one or more software components (e.g., software running on a computing device).

In some implementations, the audio information may be obtained based on a user's interaction with a user interface/application (e.g., video editing application, video capture application), and/or other information. For example, a user interface/application may provide option(s) for a user to select one or more sounds (e.g., music, verbal direction) to be played back during capture of visual content. The audio information defining the sound(s) may be obtained based on the user's selection of the sound(s) through the user interface/application.

The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats.

The audio content may have an audio progress length. The audio progress length may be defined in terms of time duration and/or other measurable factors. For example, audio content may have a time duration of five minutes. Other progress lengths and time durations are contemplated.

Moments within the audio progress length may be associated with cue markers. A cue marker being associated with a moment within the audio progress length may include the cue marker identifying the moment, the cue marker being tied to the moment, the cue marker being connected to the moment, and/or the cue marker being otherwise associated with the moment. A moment within the audio progress length may refer to a point in time or a duration of time within the audio progress length. A cue marker may refer to a marker that indicates location of a cue. A cue may signal that the corresponding location may be used in automatically generating a video edit. A cue marker may mark a point in time or a duration of time within the audio progress length as a location in which one or more edits may be made for generating a video edit. A cue marker may mark a point in time or a duration of time within the audio progress length as a location to guide making edits for generating a video edit. For example, a cue marker may mark a moment within the audio progress length as a location in which a video edit may transition from one video clip to another video clip. A cue marker may mark a moment within the audio progress length as a location in which something of interest is occurring for a video edit. A cue marker may mark a moment within the audio progress length as a location in which a video edit may include a visual effect. Other indications and/or edits are contemplated.

Moments within the audio progress length may be associated with cue markers based on analysis of the audio content, user input, and/or other information. For example, audio content may be analyzed to determine locations of particular sounds, and the moments corresponding to the particular sounds may be associated with cue markers. As another example, a user may manually associate particular moments within the audio progress length with cue markers, manually move moments with which the cue markers are associated, manually delete association between moments and cue markers, and/or make other manual changes to the cue markers.

In some implementations, the audio content may include music. Music may refer to vocal and/or instrumental sounds. For example, music may include one or more songs, instrumental musical piece, soundtrack, and/or other music. In some implementations, moments corresponding to particular musical features within the audio progress length of music may be associated with cue marker. For example, moments corresponding to bars and/or beats of the music may be associated with cue markers. That is, moments within the audio progress length of the music associated with cue markers may include bars and/or beats of the music. For instance, a song may be obtained for use in capturing visual content, and the song may be analyzed to identify the bars and/or beats of the song. The moments of the bars and/or beats of the song may be associated with cue markers/used as cues in generating a video edit.

In some implementations, the audio content may include verbal direction. Verbal direction may refer to direction that is expressed in words. For example, verbal direction may include spoken words that guide user(s) of the image capture device to perform one or more actions. For instance, verbal direction may include countdown to an action to be performed (e.g., 4-3-2-1-Dance!). Moments corresponding to particular words/direction of the verbal direction may be associated with cue markers. For example, in an example of verbal direction to start dancing, a moment corresponding to word "Dance" may be associated with a cue marker.

Figure 4:
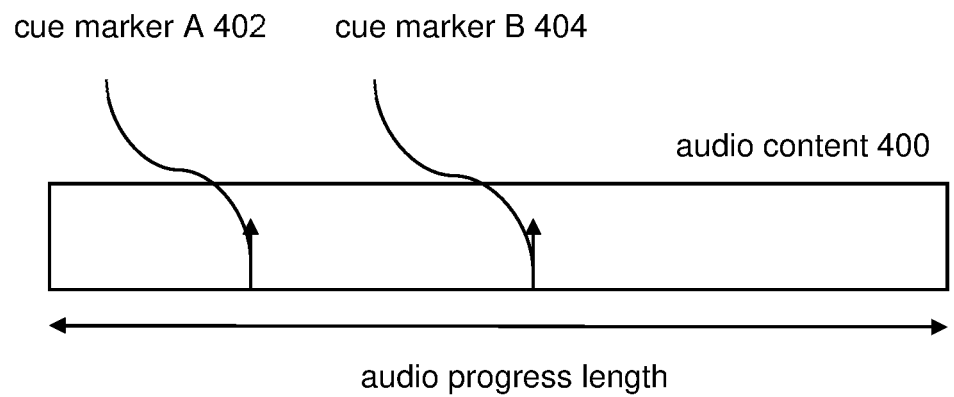
FIG. 4 illustrates example cue markers for moments within audio progress length.

FIG. 4 illustrates example cue markers for moments within audio progress length. In FIG. 4, audio content 400 may be shown to have an audio progress length. Two moments within the audio progress length may be associated with cue markers. For example, a cue marker A 402 may be associated with a moment near the beginning of the audio progress length, and a cue marker B 404 may be associated with a moment near the middle of the audio progress length.

The audio playback component 104 may be configured to effectuate playback of audio content through one or more speakers. Effectuating playback of audio content through speaker(s) may include using the speaker(s) to provide playback of the audio content. The audio playback component 104 may be configured to effectuate playback of at least a portion of the audio progress length of the audio content through the speaker(s) for capture of the visual content. For example, the audio playback component 104 may be configured to effectuate playback of the entire length of the audio content or one or more parts of the audio content through the speaker(s) for capture of the visual content. Provide playback of audio content for capture of visual content may include providing playback of the audio content while an image capture device is capturing visual content. For example, referring to FIG. 3, the image capture device 302 may provide playback of audio content through the speaker 308 so that the audio content is heard by user(s) of the image capture device 302 while the image capture device 302 is capturing visual content.

Figure 5:
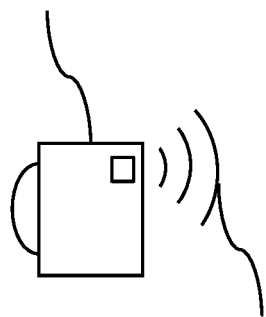
FIG. 5 illustrates example audio content playback by an image capture device.
Figure 5:

FIG. 5 illustrates example audio content playback by an image capture device. In FIG. 5, the image capture device 502 may be operating to provide audio content playback 504 while the image capture device 502 is capturing visual content. In some implementation, the image capture device 502 may provide playback of audio content for capture of visual content when it is operating in a particular mode (e.g., music playback & sync mode). For example, the audio content playback 504 may include the image capture device 502 playing music via one or more speakers when the image capture device 502 is capturing a video.

The playback of the audio content may be provided during the capture duration of the visual content. In some implementations, the playback of the audio content may pause at an end of the capture duration. For example, the image capture device may provide playback of music while the image capture device is recording a video. When the recording of the video is stopped/paused, the playback of the music may be paused.

The playback of the audio content may continue at a beginning of another capture duration. For example, returning to the example of the image capture device providing playback of the music, the playback of the music may have been paused due the to the recording of the video being stopped/paused. When recording of the next video is started, the playback of the music may resume from the paused moment.

In some implementations, one or more previews of the audio content may be provided prior to the capture of the visual content. For example, before the image capture device starts capture of a video, the image capture device may provide playback of audio content to be played during capture of the video. Such provision of the audio content may allow the user(s) of the image capture device to anticipate the sounds that will be played. Preview(s) of the audio content may include preview of the entire length of the audio content or one or more parts of the audio content. For example, preview(s) of a part of the audio content that will be provided for capture of visual content may be provided prior to the capture of the visual content.

In some implementations, an extent of the audio content to be played back during the capture of the visual content may be determined prior to the capture of the visual content. The extent of the audio content to be played back may refer to an amount/part of the progress length of the audio content to be played back. For example, a user may choose a predefined amount of audio content to be played back during the capture of the visual content. That is, a portion of the audio progress length of the audio content to be played back during the capture duration for the visual content may be determined prior to the capture of the visual content.

The capture component 106 may be configured to capture the visual content during one or more capture durations. A capture duration may refer to a time duration in which visual content is captured. The visual content may be captured through one or more optical elements (e.g., the optical element 14). Capturing visual content during a capture duration may include using, recording, storing, and/or otherwise capturing the visual content during the capture duration. The visual content may be captured for use in generating images and/or video frames. The images/video frames may be stored in electronic storage and/or deleted after use (e.g., after preview). The visual content may be captured for use in generating audio-synchronized visual content.

For example, during a capture duration, the capture component 102 may use the visual output signal generated by the image sensor 15 and/or the visual information conveyed by the visual output signal to record, store, and/or otherwise capture the visual content. For instance, the capture component 102 may store, in the electronic storage 13 and/or other (permanent and/or temporary) electronic storage medium, information (e.g., the visual information) defining the visual content based on the visual output signal generated by the image sensor 15 and/or the visual information conveyed by the visual output signal during the capture duration. In some implementations, information defining the captured visual content may be stored in one or more visual tracks.

The visual content may have a visual progress length based on the capture duration and/or other information. The visual progress length of the visual content may be same as or different from the capture duration. For example, based on the capture of the visual content at regular speed (e.g., capture framerate is same as playback framerate), the visual progress length of the visual content may be same as the capture duration. Based on the capture of the visual content at non-regular speed(s) (e.g., slow motion capture, time-lapse capture), the visual progress length of the visual content may be different from the capture duration.

In some implementations, speed of the playback of the audio content may be changed based on speed with which the visual content is captured. For example, based on the visual content being captured at regular speed (e.g., 1× speed), regular speed of playback of the audio content may be used (e.g., audio content played at 1× speed). Based on the capture of the visual content at non-regular speed(s), (e.g., 0.5× speed, 4× speed), the speed of the playback of the audio content may be changed to match the speed of capture of the visual content. The speed of the playback of the audio content may be changed to be inverse for the speed of the capture of the visual content. For example, the speed of the playback of the audio content may be decreased when time-lapse capture is used to capture visual content (e.g., ¼× speed of audio content playback for 4× time-lapse capture), and the speed of the playback of the audio content may be increased when slow motion capture is used to capture visual content (e.g., 2× speed of audio content playback for 0.5× slow-motion capture). Such change in speed of playback of the audio content may allow the audio content to remain in synchronization with the visual content.

The capture component 106 may be configured to capture the visual content with the playback of the audio content. That is, the capture component 106 may capture the visual content while the playback of the audio content is being provided. If a portion of the audio progress length is played back, the capture component may be configured to capture the visual content with the playback of the portion of the audio progress length of audio content. For example, referring to FIG. 5, the image capture device 502 may capture visual content while it is providing the audio content playback 504.

In some implementations, the capture component 106 may be configured to capture audio content during one or more capture durations. For example, the image capture device may include one or more sound sensors (e.g., microphone), and the capture component 106 may use the sound sensors to capture sounds that are heard during capture of the visual content. In some implementations, information defining the captured audio content may be stored in one or more audio tracks. In some implementations, audio content may not be captured during capture of the visual content. For example, the image capture device may capture visual content without capturing audio content.

In some implementations, one or more audio tracks for the visual content captured during the capture duration may include the audio content. The audio track(s) for the visual content captured during the capture duration may include the audio content that was played back during the capture of the visual content. If a portion of the audio progress length is played back during the capture duration, then that portion of the audio progress length of the audio content may be included in the audio track(s) for the visual content. The audio content included in the audio track(s) may be a copy of the original audio content that was played back. Rather than including the audio content that was heard through microphone of the image capture device during capture of the visual content, the portion of the original audio content file that was played back during capture of the visual content may be copied into the audio track(s). For example, if music is played during capture of a video, with the music stored in a music file, then the portion of the music file defining the portion of the music that was played may be copied into the audio track(s). Such generation of audio track(s) may result in a video file that includes visual content synchronized to the audio content. For instance, if the visual content was captured while playing a song, then such generation of audio track(s) may result in a lip-synced video.

The synchronization component 108 may be configured to synchronize the visual content captured during the capture duration with the audio content that was played back during the capture duration. The visual content captured during the capture duration may be synchronized with the portion of the progress length of the audio content that was played during the capture duration. For example, if a portion of the audio progress length is played back during the capture duration, then the visual content may be synchronized with that portion of the audio progress length of the audio content. Synchronization of the visual content with the audio content may include identification, determination, and/or recording of moments within the visual progress length that occur at the same time as moments within the audio progress length. Synchronization of the visual content with the audio content may include identification, determination, and/or recording of moments within the visual progress length that occur at the same time as moments within the audio progress length that are associated with cue marker(s). Synchronization of the visual content with the audio content may take into account changes in capture speed of the visual content/playback speed of the audio content during capture of the visual content (e.g., slow motion capture, time-lapse capture).

For example, the synchronization component 108 may synchronize the visual content and the audio content by identifying, determining, and/or recording when a particular moment in the visual content should occur at the same time with a particular moment in the audio content during playback. The synchronization component 108 may synchronize the visual content and the audio content by storing information about the cue markers/moments associated with the cue marker(s) with the visual content. For example, information that identifies the cue markers and/or the moments associated with the cue markers may be stored as metadata for the visual content. For instance, metadata of the audio content may identify the cue markers and/or the moments associated with the cue markers, and some or entirety of the metadata may be stored as metadata of the visual content.

In some implementations, the visual content captured during the capture duration may automatically be synchronized with the audio content played during the capture duration based on operation of a single image capture device. That is, because the image capture device is both playing the audio content while it is capturing visual content, the timing of the visual content capture may automatically be matched with the timing of the audio content playback. For example, when the image capture device capture visual content of a video frame at a particular moment within the capture duration, the image capture device will also know which moment of the audio content is being played. The visual content captured by the image capture device may automatically be time-synchronized to the audio content that is played backed during capture when the visual content is captured and stored in memory.

The image capture device may automatically synchronize the visual content with the audio content without analyzing the audio content that was captured with the visual content. That is, rather than analyzing the audio content captured during the visual content to determine how the timing of visual content capture matches with the timing of the audio content playback, the image capture device may utilize its knowledge regarding timing of audio content that it is played back during the capture duration to perform the synchronization.

In some implementation, the audio content captured with the visual content may be used to modify and/or augment the synchronization of visual content with audio content. For example, there may be time difference between when timing of the audio content playback internally tracked by the image capture device and timing of the audio content playback actually provided through speaker(s) of the image capture device. The difference between the timings may be determined based on analysis of the audio content captured with the visual content, and the synchronization of visual content with audio content may be adjusted so that the synchronization matches the timing of the audio content playback actually provided through speaker(s) of the image capture device.

The synchronization component 108 may be configured to synchronize the visual content captured during the capture duration such that one or more moments within the visual progress length of the visual content are associated with one or more cue markers of the audio content. Synchronization of the visual content with the audio content may result in one or more moments within the visual progress length being synchronized with one or more moments of the audio progress length that are associated with cue marker(s).

Figure 6:
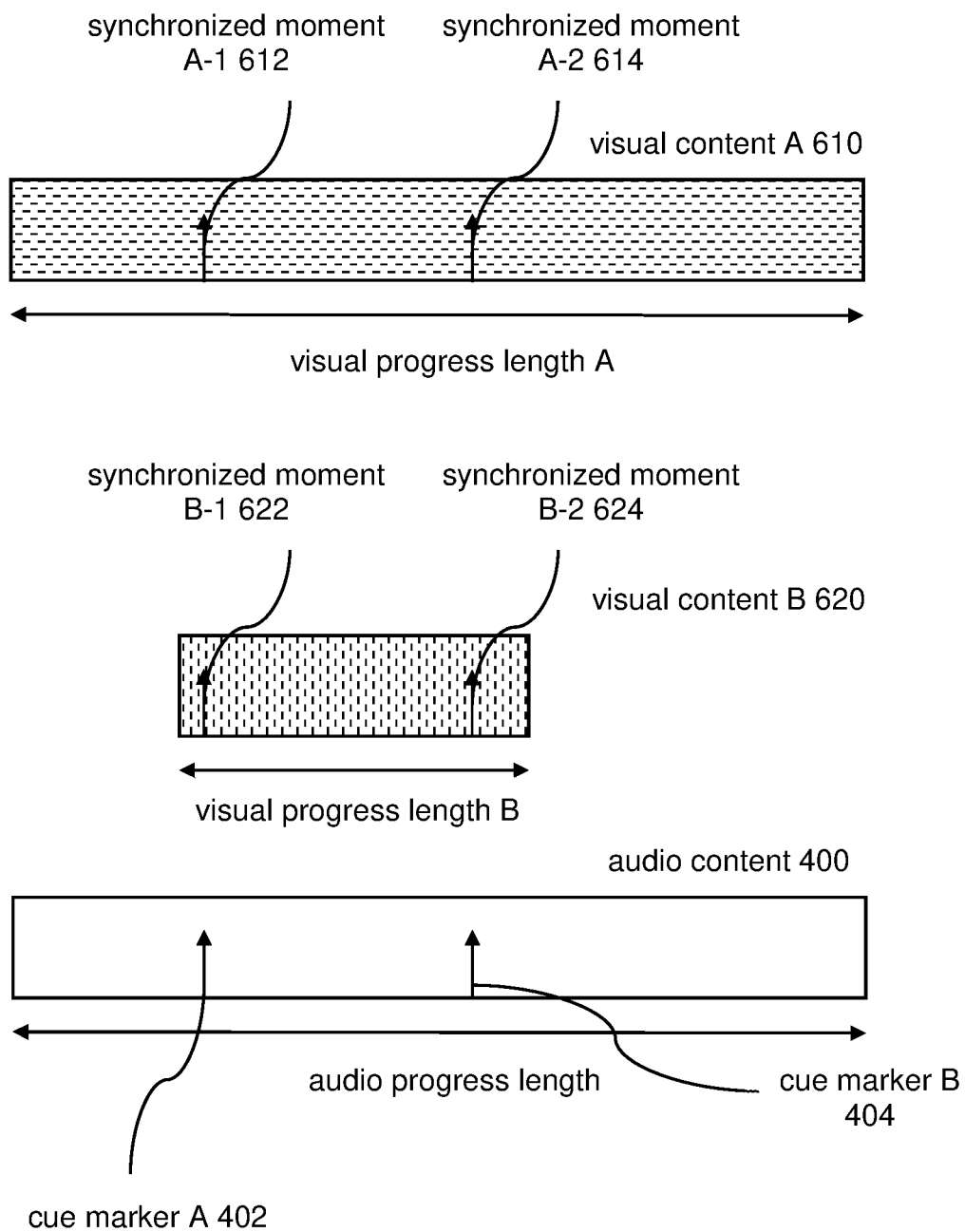
FIG. 6 illustrates example synchronized moments within visual content.

For example, FIG. 6 illustrates example synchronized moments within two different visual content. In FIG. 6, visual content A 610 and visual content B 620 may be synchronized with audio content 400. The visual content A 610 and the visual content B 620 may have been captured separately. The visual content A 610 and the visual content B 620 may have been captured while the image capture device provided playback of different portions of the audio content 400. For instance, the visual content A 610 may have been captured during playback of the entirety of the audio content 400. The visual content B 620 may have been captured during playback of a portion in the middle of the visual content 400.

The visual content A 610 may be synchronized with the entirety of the audio content 400. Such synchronization may result in a synchronized moment A-1 612 in the visual progress length A being synchronized with the moment in the audio progress length corresponding to the cue marker A 402, and a synchronized moment A-2 614 in the visual progress length A being synchronized with the moment in the audio progress length corresponding to the cue marker B 404.

The visual content B 620 may be synchronized with the portion of the audio content 400. Such synchronization may result in a synchronized moment B-1 622 in the visual progress length B being synchronized with the moment in the audio progress length corresponding to the cue marker A 402, and a synchronized moment B-2 624 in the visual progress length B being synchronized with the moment in the audio progress length corresponding to the cue marker B 404. Thus, the synchronized moment A-1 612 and the synchronized moment B-1 622 may be synchronized to the same moment in the audio progress length corresponding to the cue marker A 402, and the synchronized moment A-2 614 and the synchronized moment B-2 624 may be synchronized to the same moment in the audio progress length corresponding to the cue marker B 404. Such synchronization of different visual content may enable synchronization of visual content captured at different times, at different locations, by different image capture devices, and/or by different users. Such synchronization of different visual content may enable automatic generation of video edits that transitions between different visual content, with the transitions using the synchronized moments.

A video edit may be generated based on the cue markers and/or other information. A video edit may refer to an arrangement and/or a manipulation of one or more portions of one or more visual content. For example, a video edit may refer to an arrangement and/or a manipulation of one or more time portion(s) (e.g., time duration(s)) and/or spatial portion(s) (e.g., punchouts) of one or more video clips. A video edit may define which portions (e.g., temporal portions, spatial portions) of visual content are included for playback and the order in which the portions are to be presented on playback. A video edit may be generated as an encoded version of the video edit and/or as instructions for rendering the video edit. For example, the video edit may be encoded as a video clip, and the video clip may be opened in a video player for presentation. The video edit may be generated as instructions for presenting the video edit, such as instructions that identify arrangements and/or manipulations of visual content portions included in the video edit. For example, the video edit may be generated as information defining a director track that includes information as to which portions of visual content are included in the video edit, the order in which the portions are to the presented on playback, and the edits to be applied to the different portions. A video player may use the director track to retrieve the portions of the visual content identified in the video edit for presentation, arrangement, and/or editing when the video edit is opened/to be presented.

Generating a video edit based on the cue markers may include using moments in the visual progress length of the visual content synchronized with moments in the audio progress length of the audio content corresponding to the cue markers to generate the video edit. The synchronized moments in the visual content may be used to provide one or more effects in the video edit. An effect in the visual content may provide for visual changes and/or temporal changes in the video edit. For example, an effect may change one or more visual characteristics and/or one or more temporal characteristics of the visual content included in the video edit. A video edit may include transition between different visual content.

A video edit may be generated such that at least a portion of the visual content captured during the capture duration is included within the video edit. The portion(s) of the visual content captured during the capture duration may be included within the video edit based on the association of the moment(s) within the visual progress length of the visual content with the cue marker(s) of the audio content and/or other information. That is, which portions of the visual content are included in the video edit may be determined based on synchronization of the visual content with the audio content that was played back during capture of the visual content.

In some implementations, the audio content may include music, and moments. The video edit may be generated to include one or more bar-synced effects, one or more beat-synced effects, and/or other musical-feature effects based on the association of the moments within the audio progress lengths with the bars, the beats, and/or other musical features of the music, and/or other information. A bar-synced effect may refer to an effect that is used for a moment in the visual content that is synchronized to a moment in the audio content corresponding to a bar. A beat-synced effect may refer to an effect that is used for a moment in the visual content that is synchronized to a moment in the audio content corresponding to a beat. Same or different effects may be used for different visual content. For example, same bar-synced effects may be applied across all visual content included in the video edit. As another example different bar-synched effects may be applied to different visual content included in the video edit.

In some implementations, the video edit may be generated to include portions from multiple visual content captured during separate capture durations. For example, the video edit may be generated to include portions from different visual content captured at different times, at different locations, by different image capture devices, and/or by different users. Individual visual content may be synchronized with a corresponding portion of the same audio content (portion of the audio content that was played during capture of the visual content). For example individual visual content may be synchronized with portion(s) of same music played during capture of the visual content.

The video edit may be generated to include transitions between different visual content. Transitions within the video edit between different portions from the multiple visual content may be determined based on association of moments within corresponding visual progress length of the multiple visual content with the cue markers of the audio content, and/or other information. Moments in different visual content that are synchronized to the same cue marker of the audio content may be used to transition from one visual content to another visual content. Because the multiple visual content are synchronized to the same audio content, the synchronized moments may provide transition points that preserves the timing of the visual content and the audio content. For example, multiple visual content may have been captured while image capture device(s) provides playback of the same song. Different visual content may include depiction of different persons lip-synching to the same song. Because the different visual content are synchronized to the same song, creating transition between different visual content at the same synchronized moments may enable generation of a video edit that preserves timing of the different visual content to the song, Such transition may preserve the depiction of lip-synching by different persons in different visual content.

Figure 7:
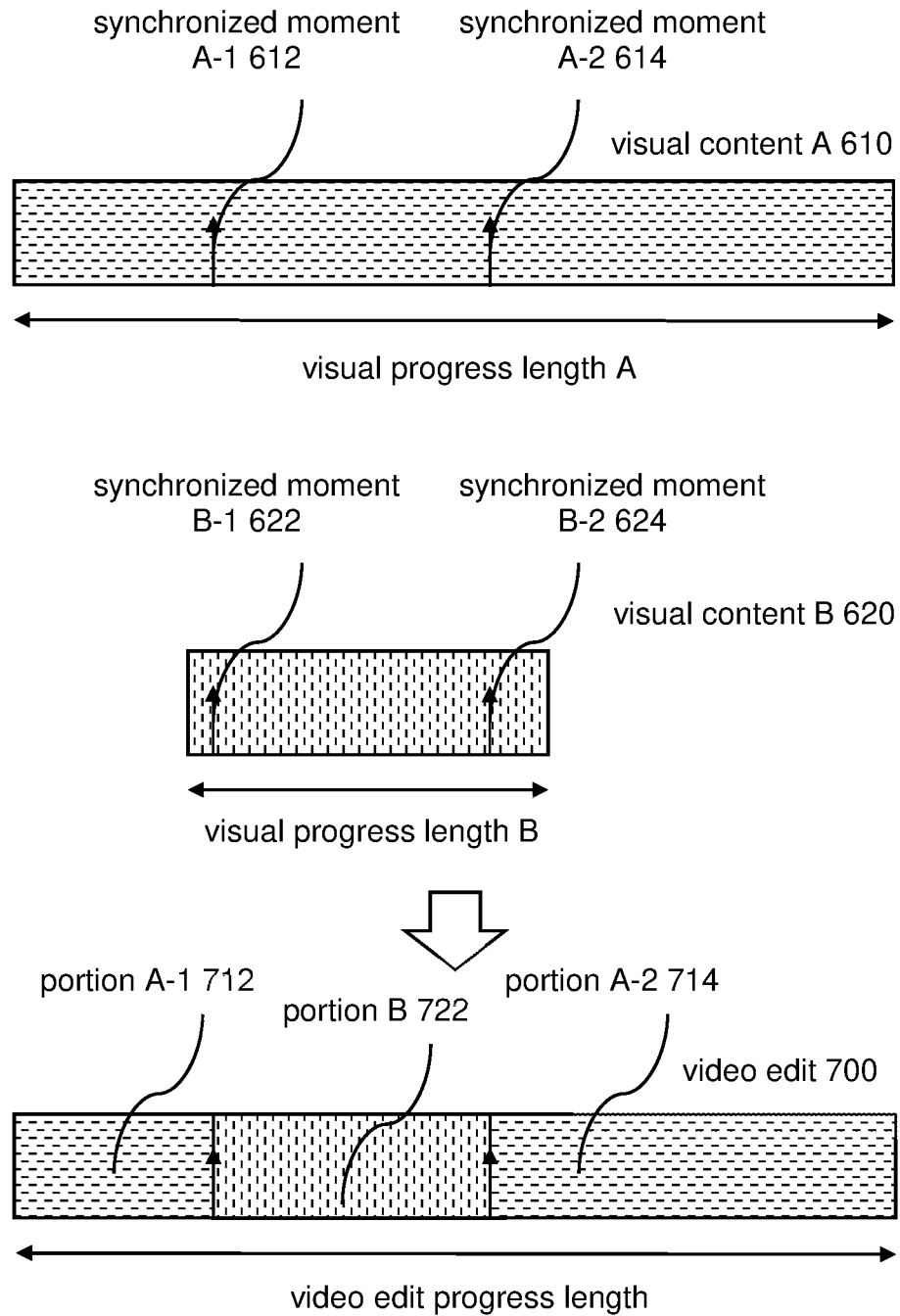
FIG. 7 illustrate example generation of a video edit.

FIG. 7 illustrate example generation of a video edit. In FIG. 7, the visual content A 610 and the visual content B 620 may be synchronized with audio content (as shown in FIG. 6). The synchronized moment A-1 612 and the synchronized moment B-1 622 may be synchronized to the same moment in the audio content, and the synchronized moment A-2 614 and the synchronized moment B-2 624 may be synchronized to the same moment in the audio content. The synchronized moment A-1 612 and the synchronized moment B-1 622 may be used to transition between the visual content A 610 and the visual content B 620. The synchronized moment A-2 614 and the synchronized moment B-1 624 may be used to transition between the visual content A 610 and the visual content B 620. For example, portions of the visual content A 610 and the visual content B 620 may be used to generate a video edit 700. The video edit 700 include a portion A-1 712 (a portion of the visual content A 610 preceding the synchronized moment A-1 612), a portion B 722 (a portion of the visual content B 620 between the synchronized moment B-1 622 and the synchronized moment B-2 624), and a portion A-2 714 (a portion of the visual content A 610 following the synchronized moment A-2 614). Use of the synchronized moments to provide transition between different visual content may result in the video edit 700 preserving the synchronized timing of the visual content A 610 and the visual content B 620 with the audio content. Other generation of video edit are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
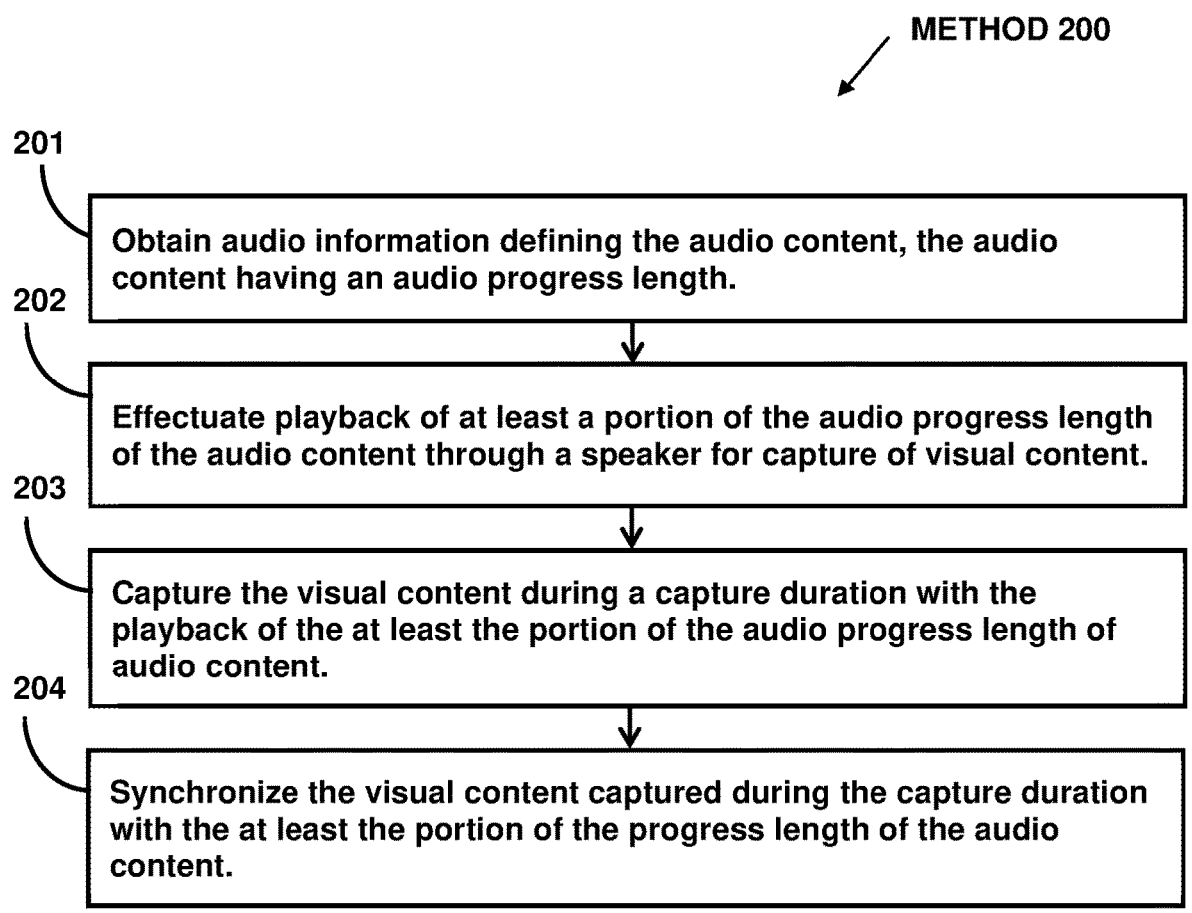
FIG. 2 illustrates an example method for generating audio-synchronized visual content.

FIG. 2 illustrates method 200 for generating audio-synchronized visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an image sensor, an optical element, a speaker, and/or other components. The optical element may guide light within a field of view to the image sensor. The image sensor may generate a visual output signal conveying visual information defining visual content based on light that becomes incident thereon. The speaker may provide playback of audio content for capture of the visual content.

At operation 201, audio information and/or other information may be obtained. The audio information may define the audio content. The audio content may have an audio progress length. Moments within the audio progress length may be associated with cue markers. In some implementation, operation 201 may be performed by a processor component the same as or similar to the audio information component 102 (Shown in FIG. 1 and described herein).

At operation 202, the playback of at least a portion of the audio progress length of the audio content through the speaker may be effectuated for the capture of the visual content. In some implementations, operation 202 may be performed by a processor component the same as or similar to the audio playback component 104 (Shown in FIG. 1 and described herein).

At operation 203, the visual content may be captured during a capture duration with the playback of the at least the portion of the audio progress length of audio content. The visual content may have a visual progress length based on the capture duration and/or other information. In some implementations, operation 203 may be performed by a processor component the same as or similar to the capture component 106 (Shown in FIG. 1 and described herein).

At operation 204, the visual content captured during the capture duration may be synchronized with the at least the portion of the progress length of the audio content. The visual content captured during the capture duration may be synchronized such that one or more moments within the visual progress length of the visual content are associated with one or more of the cue markers of the audio content. A video edit may be generated based on the cue markers and/or other information. A video edit may be generated such that at least a portion of the visual content captured during the capture duration is included within the video edit based on the association of the moment(s) within the visual progress length of the visual content with the cue marker(s) of the audio content and/or other information. In some implementations, operation 204 may be performed by a processor component the same as or similar to the synchronization component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for generating audio-synchronized visual content, the image capture device comprising:
 a housing;
 an image sensor carried by the housing and configured to generate a visual output signal conveying visual information based on light that becomes incident thereon, the visual information defining visual content;
 an optical element carried by the housing and configured to guide light within a field of view to the image sensor;

a speaker carried by the housing and configured to provide playback of audio content for capture of the visual content;
one or more physical processors configured by machine-readable instructions to:
obtain audio information defining the audio content, the audio content including music, the audio content having an audio progress length, wherein moments within the audio progress length are associated with cue markers;
effectuate the playback of at least a portion of the audio progress length of the audio content through the speaker for the capture of the visual content, wherein at least a first duration of the music is played through the speaker for the capture of the visual content;
capture the visual content during a capture duration with the playback of the at least the portion of the audio progress length of audio content, the visual content having a visual progress length based on the capture duration, wherein the image capture device internally tracks timing of the audio content playback during the capture of the visual content, wherein the internally tracked timing of the audio content playback is matched to timing of when the visual content is captured by the image capture device; and
synchronize the visual content captured during the capture duration with the at least the portion of the progress length of the audio content based on the matching of the internally tracked timing of the audio content playback to the timing of when the visual content is captured by the image capture device, one or more moments within the visual progress length of the visual content associated with one or more of the cue markers of the audio content, wherein the first duration of the music is synchronized to a second duration of the visual content that was captured during the audio content playback of the first duration of the music;
wherein a video edit is generated based on the cue markers, at least a portion of the visual content captured during the capture duration included within the video edit based on the association of the one or more moments within the visual progress length of the visual content with the one or more of the cue markers of the audio content;
wherein the audio content further includes verbal direction to direct one or more users of the image capture device to perform an action during the capture duration, the verbal direction including a countdown to the action to be performed by the one or more users;
wherein the first duration of the music that is played through the speaker for the capture of the visual content is copied from an original music file for the music to an audio track for the visual content stored in a video file; and
wherein speed of the audio content playback by the image capture device during the capture of the visual content is decreased based on time-lapse capture of the visual content and is increased based on slow-motion capture of the visual content.

2. The image capture device of claim 1, wherein:
the playback of the audio content pauses at an end of the capture duration; and
the playback of the audio content continues at a beginning of another capture duration.

3. The image capture device of claim 1 wherein the moments within the audio progress length associated with the cue markers include bars or beats of the music.

4. The image capture device of claim 3, wherein the video edit is generated to include one or more bar-synced effects or one or more beat-synced effects based on the association of the moments within the audio progress lengths with the bars or the beats of the music.

5. The image capture device of claim 1, wherein:
the video edit is generated to include portions from multiple visual content captured during separate capture durations, individual ones of the multiple visual content synchronized with a corresponding portion of the audio content; and
transitions within the video edit between different ones of the portions from the multiple visual content are determined based on association of moments within corresponding visual progress length of the multiple visual content with the cue markers of the audio content.

6. The image capture device of claim 1, wherein the one or more physical processors are further configured by the machine-readable instructions to provide a preview of the at least the portion of the audio progress length of the audio content prior to the capture of the visual content.

7. A method for generating audio-synchronized visual content, the method performed by an image capture device including one or more processors, an image sensor, an optical element, and a speaker, the image sensor configured to generate a visual output signal conveying visual information based on light that becomes incident thereon, the visual information defining visual content, the optical element configured to guide light within a field of view to the image sensor, the speaker configured to provide playback of audio content for capture of the visual content, the method comprising:
obtaining audio information defining the audio content, the audio content including music, the audio content having an audio progress length, wherein moments within the audio progress length are associated with cue markers;
effectuating the playback of at least a portion of the audio progress length of the audio content through the speaker for the capture of the visual content, wherein at least a first duration of the music is played through the speaker for the capture of the visual content;
capturing the visual content during a capture duration with the playback of the at least the portion of the audio progress length of audio content, the visual content having a visual progress length based on the capture duration, wherein the image capture device internally tracks timing of the audio content playback during the capture of the visual content, wherein the internally tracked timing of the audio content playback is matched to timing of when the visual content is captured by the image capture device; and
synchronizing the visual content captured during the capture duration with the at least the portion of the progress length of the audio content based on the matching of the internally tracked timing of the audio content playback to the timing of when the visual content is captured by the image capture device, one or more moments within the visual progress length of the visual content associated with one or more of the cue markers of the audio content, wherein the first duration of the music is synchronized to a second duration of the visual content that was captured during the audio content playback of the first duration of the music;

wherein a video edit is generated based on the cue markers, at least a portion of the visual content captured during the capture duration included within the video edit based on the association of the one or more moments within the visual progress length of the visual content with the one or more of the cue markers of the audio content;

wherein the audio content further includes verbal direction to direct one or more users of the image capture device to perform an action during the capture duration, the verbal direction including a countdown to the action to be performed by the one or more users;

wherein the first duration of the music that is played through the speaker for the capture of the visual content is copied from an original music file for the music to an audio track for the visual content stored in a video file; and wherein speed of the audio content playback by the image capture device during the capture of the visual content is decreased based on time-lapse capture of the visual content and is increased based on slow-motion capture of the visual content.

8. The method of claim 7, wherein:

the playback of the audio content pauses at an end of the capture duration; and the playback of the audio content continues at a beginning of another capture duration.

9. The method of claim 7, wherein the moments within the audio progress length associated with the cue markers include bars or beats of the music.

10. The method of claim 9, wherein the video edit is generated to include one or more bar-synced effects or one or more beat-synced effects based on the association of the moments within the audio progress lengths with the bars or the beats of the music.

11. The method of claim 7, wherein:

the video edit is generated to include portions from multiple visual content captured during separate capture durations, individual ones of the multiple visual content synchronized with a corresponding portion of the audio content; and transitions within the video edit between different ones of the portions from the multiple visual content are determined based on association of moments within corresponding visual progress length of the multiple visual content with the cue markers of the audio content.

12. The method of claim 7, further comprising providing a preview of the at least the portion of the audio progress length of the audio content prior to the capture of the visual content.

* * * * *